United States Patent [19]

Bathen et al.

[11] Patent Number: 5,174,695
[45] Date of Patent: Dec. 29, 1992

[54] FINEBORING MACHINE AND PROCESS FOR PRODUCING BORES WITH ANY POLAR AND/OR AXIAL GENERATING LINE

[75] Inventors: Roland Bathen, Weissach; Werner Musiol, Kornwestheim, both of Fed. Rep. of Germany

[73] Assignee: Mahle GmbH, Stuttgart, Fed. Rep. of Germany

[21] Appl. No.: 634,228

[22] PCT Filed: Aug. 17, 1989

[86] PCT No.: PCT/DE89/00539

§ 371 Date: Jan. 3, 1991

§ 102(e) Date: Jan. 3, 1991

[87] PCT Pub. No.: WO90/02010

PCT Pub. Date: Mar. 8, 1990

[30] Foreign Application Priority Data

Aug. 25, 1988 [DE] Fed. Rep. of Germany ....... 3828854

[51] Int. Cl.⁵ ............................................. B23B 41/04
[52] U.S. Cl. .................................. 408/159; 82/1.3; 82/1.5; 408/714
[58] Field of Search ............... 82/1.11, 1.2, 1.3, 1.4, 82/1.5, 131; 408/159, 714, 1 R; 409/233

[56] References Cited

U.S. PATENT DOCUMENTS

| | | | |
|---|---|---|---|
| 3,391,585 | 7/1968 | Griswold et al. | 82/1.4 |
| 3,740,161 | 6/1973 | Milewski | 408/158 |
| 4,161,127 | 7/1979 | Tiffin | 82/1.4 |
| 4,195,957 | 4/1980 | Wittkopp et al. | 408/148 |
| 4,250,775 | 2/1981 | Jerue et al. | 82/1.11 |
| 4,412,465 | 11/1983 | Wright | 82/1.2 |
| 4,452,553 | 6/1984 | Kaminsky | 408/153 X |
| 4,612,833 | 9/1986 | Slee | 82/1.3 X |
| 4,671,145 | 6/1987 | Fehrenbach et al. | 82/1 C |
| 4,676,704 | 6/1987 | Donnini et al. | 82/1.2 X |
| 4,742,738 | 5/1988 | Strand | 82/1.11 |
| 4,790,221 | 12/1988 | Iwata et al. | 82/1.2 X |

FOREIGN PATENT DOCUMENTS 1920939 11/1969 Fed. Rep. of Germany .
8700473 1/1987 PCT Int'l Appl. .

Primary Examiner—Steven C. Bishop
Attorney, Agent, or Firm—Collard & Roe

[57] ABSTRACT

Safe and structurally simple design for a finebore machine with a turning tool (3) mounted on a boring bar (2), whereby the excursion of the turning tool is produced by a piezoelectric servomotor without any magnetic actuation. This is achieved in the following manner: (a) the turning tool (3) is lodged in a spring-mounted tool holder (4) which is made to deflect by a translatory driving servomotor (6); (b) the driving direction of the servomotor (6) is perpendicular to the operating direction of the turning tool (3); (c) the driving strength of the servomotor (6) acts on the one end of a connecting rod (8) which is lodged separately from the servomotor (6); (d) the other end of the connecting rod (8) abuts on the free mobile end of the tool holder (4) in a fixed position relative to the latter. The shape of the bore to be produced can be preset as an electronic image.

4 Claims, 1 Drawing Sheet

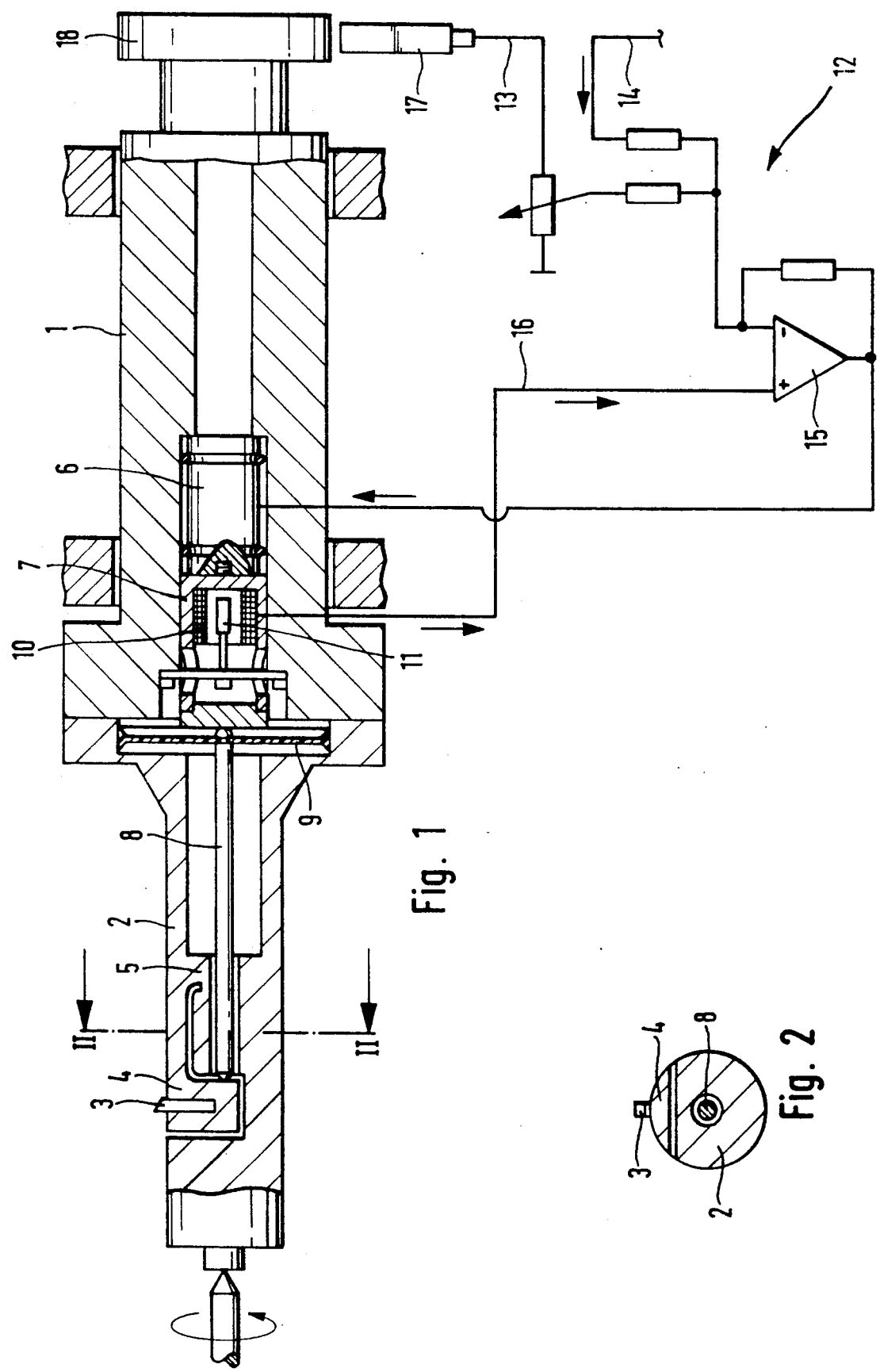

FINEBORING MACHINE AND PROCESS FOR PRODUCING BORES WITH ANY POLAR AND/OR AXIAL GENERATING LINE

The invention relates to a fineboring machine and process for producing bores with any polar and/or axial generating line.

Such a boring machine is known from DE 32 45 053 A1. It is possible, using that machine, to produce bores with any polar and/or axial generating line. There, this is achieved by a boring bar divided longitudinally, with different materials bonded with one another, which can be deflected radially relative to the axis of rotation, within a magnetic field applied externally, by the magnetostrictive length change caused by the magnetic field.

For lathes, it is furthermore known from DE 34 46 306 A1, to provide the holder of the tool with an elastically bendable area and to deflect it using a piezoelectric servomotor to produce micromovements for tool operation.

Proceeding from DE 32 45 053 A1, the invention is based on the task of achieving excursion of the tool using a piezoelectric servomotor, without the use of magnetic drives, in safe and structurally simple manner.

Due to the transfer of the driving force proceeding from the servomotor to the deflectable tool holder with a connecting rod, as proposed according to the invention, it is possible to use actuators which cannot be housed within the tool holder holding the boring bar, due to their size.

For exact finishing of the bores according to a precisely defined shape, it is proposed to detect the actual position of the tool during finishing via a measurement device directly or indirectly connected to the tool, and to compare it with the desired reference value pre-set for the servomotor. In case of a deviation between the two values, the control values to be input into the servomotor must be corrected in the direction of a reduction in the deviation found. This correction is achieved by the use of a known position control circuit in the control of the servomotor.

An embodiment is shown in the drawing. The drawing shows

FIG. 1 a longitudinal cross-section through a boring bar connected with the work spindle of a fineboring machine, together with a wiring diagram for the control of the servomotor drive FIG. 2 a cross-section through the boring bar according to Line II—II in FIG. 1

At the work spindle 1 of a fineboring machine, not shown in greater detail, a boring bar 2 is attached in interchangeable manner. A turning tool 3 is rigidly connected with a tool holder 4. The tool holder 4 can be deflected by spring action, relative to the axis of rotation of the boring rod 2. The tool holder 4 is directly connected with the boring bar 2 only via the stay 5. The tool holder 4 is made of the material of the boring bar 2 and is separated from the latter by electroerosion.

Radial deflection of the tool holder 4 is caused by a piezoelectric servomotor 6 arranged in the work spindle 1. The servomotor 6 transfers its setting movements to a connecting rod 8 arranged in the axis of rotation of the boring bar, to the free end of the tool holder 4, via an intermediate piece 7. The connecting rod 8 attaches to the tool holder 4, or is connected with it, in such a way that during excursion of the tool holder 4, no radial relative movements occur between the latter and the connecting rod 8.

At its end facing the servomotor 6, the connecting rod 8 is mounted in a membrane 9 which runs perpendicular to the drive direction. The membrane 9 can be rigidly connected with the removable boring bar or with the work spindle.

The intermediate piece 7 serves as a measuring device for the value of the operating movements proceeding from the servomotor 6 in each case. For this purpose, the intermediate piece 7 is structured as a path sensor. The function as a path sensor is brought about by the use of an induction coil 10, in that a metal piece 11 which is rigidly connected with the work spindle 1 and can be magnetized engages with the induction coil.

The reference shape of the bore to be produced can be pre-set as an electronic image. From this electronic image, the pulses required for excursion can be applied to the servomotor 6.

Since interference factors proceed from the system as a whole, which can be produced, for example, by a change in the temperature of the servomotor 6 or the parts of the work spindle 1 which surround it, the actual drive movement of the servomotor is continuously determined by the intermediate piece 7 structured as a path sensor. The actual value of the operating movement of the servomotor 6 measured in this way in each case is passed to a position control circuit 12 Additional values passed to this position control circuit are the reference shape of the bore to be produced, with the polar component being passed along via line 13 and the axial component (generating line of the bore in the axial direction) being passed along via line 14. In a comparator 15, to which the actual value measured in the intermediate piece 7 is passed via a line 16, the setting value to be passed to the servomotor 6, corrected for interference, is continuously produced.

Instead of via an electronic image, the reference shape of the bore to be produced can also be derived by an inductor sensor 17 of a template 18 which turns with the work spindle. The template 18 has the non-circular shape of the bore to be produced.

The operating movements which can be produced in the turning tool 3 with the device according to the invention as described are limited to a few tenths of a millimeter. If bores with diameter differences beyond this are to be produced, boring bars with different diameters must be used. This means that a series of boring bars has to be kept on hand in order to be able to finish bores of different sizes. For this reason, it is extremely advantageous that the servomotor 6 is not arranged directly within the boring bar 2. If it were, each boring bar would have to be equipped with a separate servomotor, which would be uneconomical. In case of an arrangement of the servomotor in the boring bore, another problem would be that each time, electrical wiring relative to the work spindle 1 would have to take place. In order to avoid such wiring during boring rod replacement, it is also advantageous to provide the measurement device for determination of the actual value of operating movements in the work spindle 1. In this case it is accepted as unavoidable that interference factors which occur outside the work spindle cannot be determined. This procedure is acceptable, since no noteworthy interference factors occur outside the work spindle.

We claim:

1. Fineboring machine with a turning tool on a boring rod which rotates about an axis, which attaches to a tool holder tangentially to the direction of rotation and can be deflected radially by spring action, for producing bores with any polar and/or axial generating line, comprising:
- (a) a translatory driving servomotor; a spring-mounted tool holder which can be deflected by said translatory driving servomotor; and
  a turning tool mounted on said tool holder;
- (b) said turning tool having an operation direction;
  said servomotor having a driving direction; and the driving direction of the servomotor is perpendicular to the operation direction of the turning tool;
- (c) said servomotor having a driving force;
  a connecting rod having one end and a second end and mounted separately from the servomotor; and
  the driving force of the servomotor acting on said one end of the connecting rod;
- (d) said tool holder having a free deflectable end;
  the second end of the connecting rod attached to the free, deflectable end of the tool holder in a fixed position relative to the latter; and
- (e) a membrane having a first end which runs perpendicular to the driving direction at its first end; and
  said connecting rod attached to said membrane.

2. Fineboring machine according to claim 1, comprising:
   a work spindle;
   a boring bar removably connected with the work spindle;
   said turning tool attached to said boring bar;
   said servomotor attached in the work spindle; and
   said membrane being mounted in the boring bar.

3. Fineboring machine according to claim 2, wherein said tool holder which is made from the material of the essentially round boring bar can be deflected by spring action, is shaped as a separate bracket which is hinged only in the direction towards the boring rod axis, angled off radially to the inside, by means of electroerosive material removal.

4. Fineboring machine according to claim 1, wherein the servomotor functions as a piezoelectric material.

* * * * *